United States Patent Office 3,228,282
Patented Jan. 11, 1966

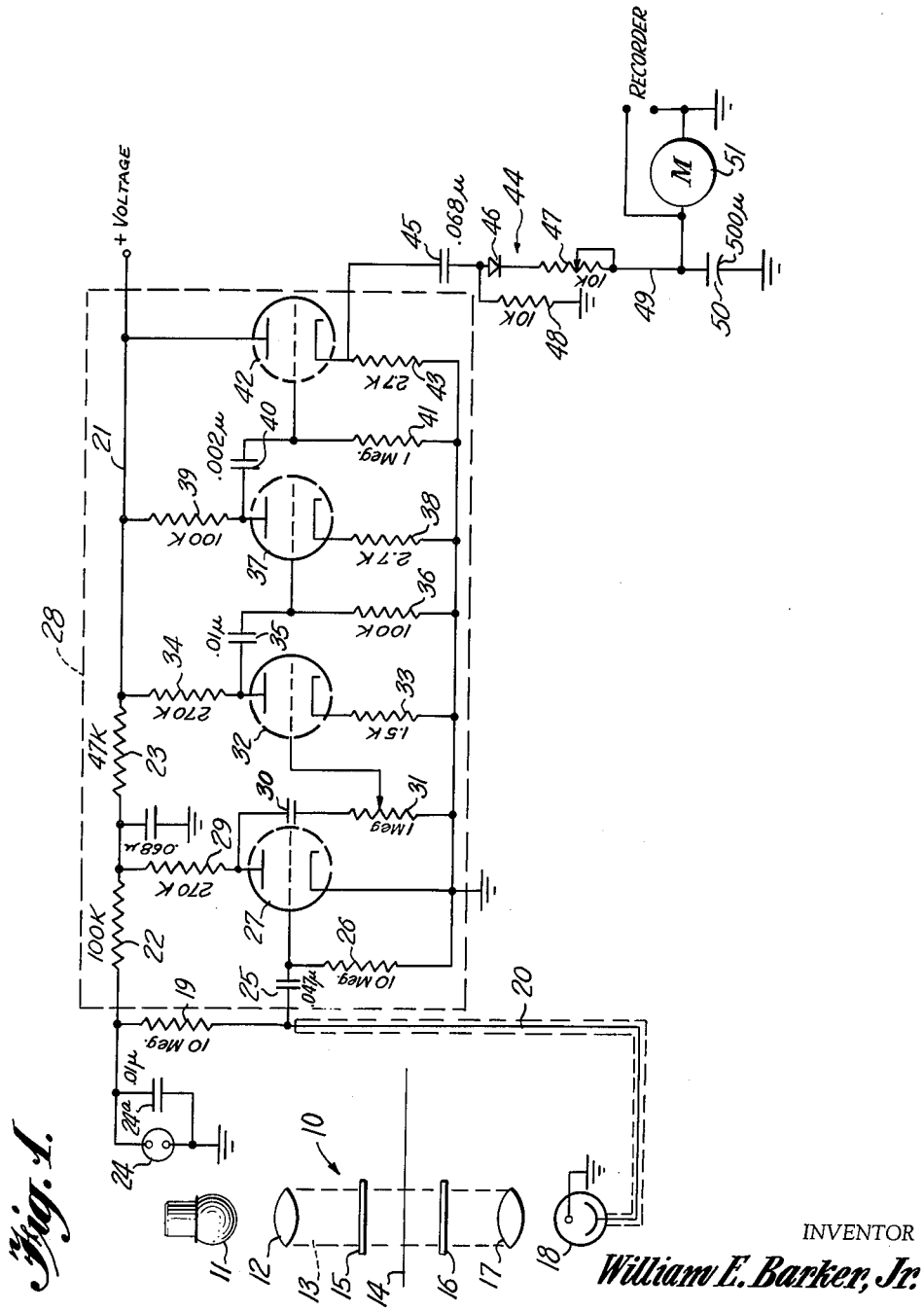

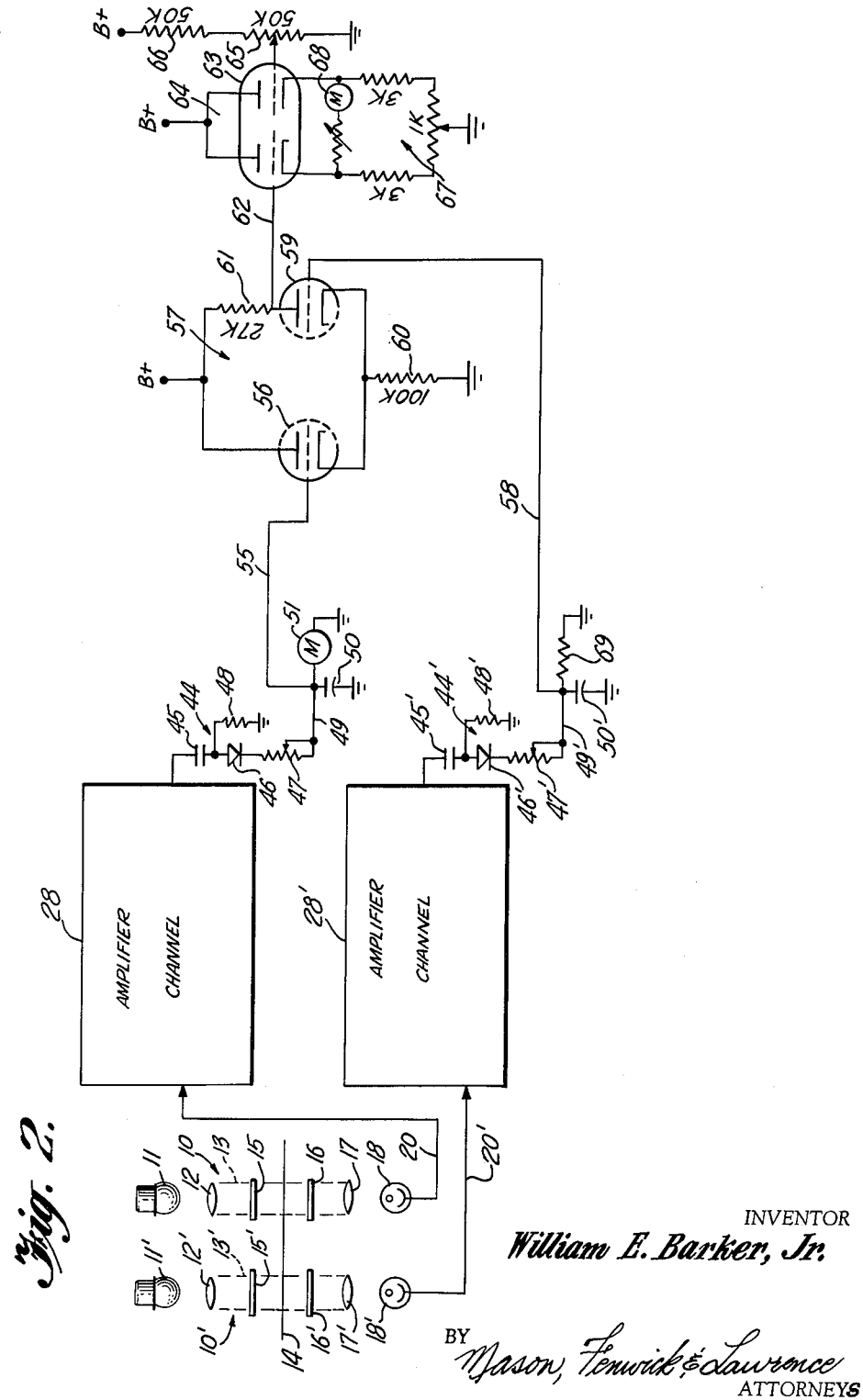

3,228,282
APPARATUS FOR MEASURING AND RECORDING BASIS WEIGHT OF PAPER AND THE LIKE
William E. Barker, Jr., Gainesville, Fla., assignor, by mesne assignments, to Brun Corporation, Columbus, Ohio
Continuation of application Ser. No. 34,829, June 8, 1960. This application Apr. 17, 1964, Ser. No. 363,047
7 Claims. (Cl. 88—14)

This application is a continuation of my earlier copending application Serial No. 34,829, filed June 8, 1960, now abandoned.

The present invention relates in general to apparatus for measuring and recording qualities of paper during the manufacture thereof, and more particularly to apparatus for measuring and recording the basis weight of paper continuously during manufacture of the paper, and where desired, for measuring the moisture content or other selected qualities of the paper sheet.

The basis weight of paper expressed in pounds is the weight of a ream of 480 and/or 500 sheets of size 24 inches by 36 inches equalling 2880 square feet or 3000 square feet respectively. The maintenance of uniformity of the basis weight across a paper sheet as it is being produced has been a problem in the paper manufacturing industry for many years. The process heretofore used for measuring the basis weight of paper has been to sample material from the production line to determine its basis weight and then adjusting the paper machine manually to correct any error. Because of time lags and delays inherently involved in the use of this sampling technique, many tons of non-specification paper may be produced before an error is detected and appropriate correction made.

An object of the present invention is the provision of novel apparatus for measuring and recording selected qualities of paper continuously as the paper sheet is being produced to promptly detect any errors in the selected quality and provide signals which may be employed to sound an alarm or automatically control the paper making machine to correct the error.

Another object of the present invention is the provision of novel apparatus for continuously monitoring the basis weight of paper during the production of the paper sheet in a manner providing a non-contact, non-destructive measurement of the basis weight to instantly indicate the existence of any errors in basis weight and the extent of the error.

Another object of the present invention is the provision of novel apparatus for measuring the basis weight of paper continuously as the paper is being produced by scanning a radiant energy beam of selected wave length across the width of the paper and detecting such radiation emerging from the paper in a manner to continuously sense and record the basis weight of the paper.

Another object of the present invention is the provision of novel apparatus for measuring the basis weight of paper continuously as the paper is being produced by scanning a radiant energy beam of selected wave length across the width of the paper and detecting such radiation emerging from the paper in a manner to continuously sense and record the basis weight of the paper, wherein means are provided to prevent disturbance of the basis weight measurement by the moisture content of the paper sheet.

Another object of the present invention is the provision of means for continuously scanning a paper sheet as it is being produced by radiant energy of selected frequencies and detecting emerging radiation energy from the paper sheet in a manner to provide detection signals responsive to the basis weight of the sheet independent of the moisture content of the paper and other detection signals which are proportional to the basis weight of the paper with a moisture induced error, and means for combining these signals to produce a signal which is proportional only to the moisture content of the paper sheet.

Other objects, advantages and capabilities of the present invention will become apparent from the following detailed description, taken in conjunction with the accompanying drawings illustrating two preferred embodiments of the invention.

In the drawings:

FIGURE 1 is a schematic diagram of apparatus for measuring the basis weight of paper, embodying the present invention; and FIGURE 2 is a diagram, partially in block diagram form and partially in schematic form, illustrating apparatus for measuring basis weight of paper and the moisture content thereof.

The apparatus of the present invention, in general, comprises a paper sensing unit which may either remain at a stationary position in the path of the paper sheet emerging from the paper machine or may be swept transversely back and forth across the sheet, the sensing means including a source of radiant energy and filtering means for passing through the paper sheet radiant energy of particular defined wave lengths which are substantially unaffected by the moisture content of the paper, photoelectric detection means for quantitively responding to the radiant energy emerging from the paper sheet, means for amplifying the signal output from the photoelectric means which is modulated in response to the modulation of the radiant energy beam by variations in the fiber content of the paper sheet and absorbance of the radiant energy by the bond structure of the cellulose molecule as the paper sheet continuously advances through the radiant energy beam, the amplifier means including several stages of selected time constants to provide a selected frequency response and means for rectifying the amplified modulated signal to provide a D.C. voltage output that is approximately equal to an average to R.M.S. amplitude as compared to the peak amplitude excursion of the signals, and means for measuring or recording this D.C. voltage output in terms of the basis weight of paper. Due to the selection of particular frequencies of radiant energy, the moisture content of the paper sheet will not cause any error in the reading, whether the paper be soaking wet or bone dry or have some moisture condition between these limits, so that an accurate and immediate sensing of any variations which may occur in basis weight is made available. Further, by simultaneously sensing the transmission of other radiant energy wave lengths through the paper which are affected by the moisture content, a signal proportional to basis weight which does have a moisture caused error can be combined with signals proportional to the basis weight without moisture error to provide information as to the moisture content of the paper sheet.

Referring to the drawings wherein like reference characters designate corresponding parts throughout the several figures, and particularly to the embodiment shown in FIGURE 1, the apparatus for measuring the basis weight of paper as it is being produced comprises a detector or sensing unit 10 disposed at a suitable location relative to paper emerging from a paper making machine, for example adjacent a stack of calendar rolls, to continuously monitor the paper sheet being produced. The detector unit 10 in the embodiment herein illustrated is designed to be scanned transversely across the width of the paper sheet, although it will be understood that the system may employ a single detector head which is fixed at a particular location transversely of the emerging paper sheet to only measure a selected zone of the paper along a longitudinal path, or it may include a plurality of fixed detector heads spaced transversely of the paper. The detector unit 10 includes a radiant energy emitter or source 11 such as an incandescent lamp of the automotive type having high thermal inertia, the lamp being supplied from a well regulated supply to provide substantially constant light intensity. The emergent light produced by the radiant energy source 11 is passed through an optical lens 12 and an associated slit to concentrate the energy in a defined beam 13. The paper sheet 14 is drawn through the radiant energy beam 13 in a horizontal direction as viewed in FIGURE 1, and a pair of identical filters 15 and 16 are located on opposite sides of the sheet 14 in the path of the beam 13 to restrict the wave length of the beam to a particular region. In the preferred example herein illustrated, the filters 15 and 16 are chosen to restrict the wave length of the radiant energy beam 13 passing through the paper to about 7500 angstrom units, it having been found that radiant energy in this region is not affected by the moisture content of the paper sheet. The radiant energy in this frequency range emerging from the paper sheet 14 and the filter 16 is then imaged by a lens 17 onto the sensitive element of a phototube 18, preferably selected so as to have a peak response at the wave length of the emergent beam 13.

It will be appreciated that the radiant energy beam 13 from the emitter or source 11 is modulated by the moving paper sheet 14, the variations in the fiber content in the paper sheet and the absorbance of energy by the band structure of the cellulose molecule providing the modulation as the paper sheet moves through the scanning station. The modulated beam of radiant energy then passes through the filter 16 and the photosensitive detector or phototube responds to the fluctuations in the intensity of the emergent radiant energy beam to produce a variation in current through the phototube load resistor 19 connected through the shielded cable 20 in series with the phototube between ground and a source of positive potential supplied through the conductor 21 from a well regulated power supply. The voltage at the upper end of phototube load resistor 19 is dropped by resistors 22 and 23 and a neon glow tube 24 and parallel capacitor 24a are connected between the upper end of the phototube load resistor 19 and ground to provide voltage regulation to maintain 65 volts as the source voltage for the phototube 18.

The voltage variations at the lower end of the phototube load resistor 19 produced by variations in current therethrough responsive to changes in the intensity of the radiant energy beam sensed by the phototube 18 are coupled through the coupling capacitor 25 and across the grid bias resistor 26 to the control grid of an amplifier 27 constituting the first stage of a multistage A.C. coupled amplifier channel 28 and formed by a triode section of a duo-triode tube such as a 12AX7 tube. The cathode of the triode section 27 is coupled directly to ground and its plate is coupled through a plate load resistor 29 and through the resistor 23 to the conductor 21 connected to the regulated plate voltage supply. The signal at the plate of the triode 27 is coupled through a coupling capacitor 30 and the portion of the potentiometer 31 above its wiper contact to the grid of a second triode amplifier 32, which may be the other triode section of the 12AX7 duo-triode, the cathode of which is coupled through a cathode biasing resistor 33 to ground and the plate of which is coupled through the plate load resistor 34 to the plate voltage supply. The signal at the plate of the triode section 32 is coupled through coupling capacitor 35 and across resistor 36 to the grid of another triode stage 37, which may be one section of a 12AU7 duo-triode, the cathode of which is coupled through the cathode biasing resistor 38 to ground and the plate of which is coupled through the plate load resistor 39 to the plate voltage supply. The signal at the plate of the triode section 37 is coupled through coupling capacitor 40 and across resistor 41 to the grid of the last amplifier triode stage 42, which may be the other section of the 12AU7 duo-triode intercoupled as a cathode follower amplifier and having a cathode load resistor 43. The A.C. coupled amplifier channel 28 has a selected frequency response determined by the resistor-capacitor networks 35, 36 and 40, 41 to eliminate from the output signal of the amplifier 28 unwanted components in the phototube signal representing factors which would adversely affect the basis weight measurement, the values of the circuit element forming these networks and the other elements of this exemplary embodiment being indicated on the drawings.

The signal at the cathode of the last A.C. amplifier stage 42 is coupled through a detector or rectifier network 44 including the coupling capacitor 45, the diode 46, the potentiometer 47 in series therewith, and the resistor 48 coupled from the anode of the detector diode 46 to ground, and the rectified signal is applied through the lead 49 and across capacitor 50 to a voltmeter 51 calibrated in terms of basis weight. The capacitor 50 forms an integrating network with the meter 51, the latter being for example a 50 micro ampere meter having an internal resistance of about 2000 ohms, and the network filter formed by the capacitor 45, resistor 48, potentiometer 47 and capacitor 50 having time constants selected to make the voltage sensed by the meter be approximately average in characteristic, that is to say, in the root mean square category representing about .7 of the rectified peak voltage, providing a signal that is proportional to basis weight in the paper sheet being measured. With the meter 51 calibrated in terms of the basis weight of paper, the response of the meter to the resulting D.C. voltage applied to the meter provides a continuous and accurate indication of the basis weight of the paper during the production thereof, which because of the particular wave lengths involved in the measurement are unaffected by the moisture content of the paper sheet.

FIGURE 2 illustrates apparatus arranged to provide an indication of the moisture content of the paper sheet being produced as well as an indication of the basis weight free of moisture induced error. Referring to FIGURE 2, the apparatus includes the same detector unit 10, A.C. coupled amplifier channel 28, and detector network 44 illustrated in FIGURE 1 and described in connection therewith, and in addition includes similar components for producing a D.C. voltage which is proportional to basis weight and includes a moisture caused error so that by combining the two D.C. voltages and subtracting, a moisture content measurement can be provided. Since many of the components of the detector unit, the multistage A.C. coupled amplifier channel and the detector network of the channel for producing the signal proportional to basis weight with moisture caused error are identical, except for some circuit values, to the corresponding components of FIGURE 1 apparatus, the reference characters for the former are indicated as the primes of the reference characters applied to corresponding components of the latter.

In order to provide the D.C. voltage proportional to basis weight with moisture induced error, an additional detector unit 10′ is provided at a location adjacent to the detector unit 10 and comprises a similar radiant energy emitter or source 11′, lenses 12′ and 17′ to concentrate the radiant energy produced by the source 11′ into a beam 13′, a phototube 18′, and a pair of filters 15′ and 16′ located an opposite sides of the sheet 14 and selected to restrict the wave length of the beam 13′ to a wave length which will be modulated in proportional relation to the basis weight of the paper and the moisture content thereof. In one practical example, the filters 15′ and 16' restrict the radiant energy beam 13' to about 4750 angstrom units, and the phototube 18' is selected so as to have a peak response to energy at this wave length.

The phototube 18' is intercoupled through a shielded cable 20' to a multistage A.C. coupled amplifier channel 28' having a circuit which may be identical to the circuit of the amplifier channel 28 except that the resistor capacitor networks of the amplifier channel 28' corresponding to the resistor capacitor networks 35, 36 and 40, 41 of the amplifier channel 28 are selected to have a particular frequency response for passing a portion of the signal applied thereto which is proportional to the basis weight of the paper sheet with the moisture induced error, an example of the circuit values of these circuit elements being indicated in FIGURE 2 of the drawings.

The output signal from the last stage of the amplifier channel 28' is similarly coupled through a detector network 44' including the coupling capacitor 45', diode 46', potentiometer 47', and by-passing resistor 48', to rectify the output signal from the amplifier channel 28'. The frequency response and integration in the amplifier channel 28' and the following detector network 44' are arranged so as to preclude any error in the resulting rectified signal arising from variations in the velocity in the paper sheet, as were the similar characteristics of the circuit illustrated in FIGURE 1.

The rectified signal derived from the detector network 44 occurring on the conductor 49, which signal is proportional to basis weight without moisture induced error is coupled through the conductor 55 to the grid of the triode amplifier stage 56 of a differential amplifier circuit 57, the triode amplifier stage 56 being for example one triode signal of a 12AT7 duo-triode tube. The rectified signal derived from the detector network 44', and applied to the lead 49' is coupled through the conductor 58 to the grid of another triode amplifier stage 59 which may be formed by the other triode section of the 12AT7 duo-triode. In the exemplary differential amplifier circuit 57 illustrated in FIGURE 2, the cathodes of the amplifier stages 56 and 59 are coupled through the common cathode resistor 60 to ground, and the plate of the triode stage 59 is coupled through the plate lead resistor 61 to the plate supply voltage source while the plate of the stage 56 is coupled directly to the plate voltage supply source, and the signal at the plate of the amplifier stage 59 is coupled through conductor 62 at the grid of a triode section of the duo-triode tube 63 in a vacuum tube voltmeter circuit 64, the grid of the other triode section of the tube 63 being connected to the wiper of a potentiometer 65 arranged in series with resistor 66 between a positive D.C. supply voltage and ground. The cathodes of the tube 63 are coupled through a resistor network 67 to ground, the resistor network including a meter 68 which is calibrated in terms of the moisture content of the paper.

It will be noted that a capacitor 50' and a resistor 69 which approximates the internal resistance of the basis weight indicating meter 51 are coupled between the conductor 49 and ground to provide an integrating network similar in action to the integrating network formed by the capacitor 50 and the internal resistance of the meter 51, and that the voltage applied through the conductor 58 to the grid of the differential amplifier stage 59 is proportional to the basis weight of the paper with a moisture induced error as a result of the selection of the wave lengths of energy passed by the filters 15' and 16' and the frequency response of the resistor capacitor networks in the amplifier channel 28' and the properties of the detector network 44'. The signal applied to the vacuum tube voltmeter circuit 64 through the conductor 62, therefore, is proportional only to the moisture content of the paper, the components of the signals applied through the leads 55 and 58 which are proportional to basis weight being subtracted out in the differential amplifier circuit 57, so that the meter 68 which is calibrated in terms of moisture content will indicate the moisture content represented by the signal applied to the vacuum tube voltmeter circuit.

The arrangement and operation of the detector unit 10' will be similar to that of the detector unit 10 in that it will either be scanned transversely across the width of the paper sheet synchronously with the detector unit 10 or will be a single stationary unit, or a plurality of stationary units corresponding to the associated detector unit 10. Because of the frequency selectively and integration of the signal as hereinabove referred to, the basis weight and/or moisture content measurements are unaffected by variations in the velocity of the paper sheet being sensed between the range of about 400 to 4000 feet per minute, which velocity range adequately covers the range of 900 to 2000 feet per minute normally used in paper manufacture. The above-described apparatus therefore provides immediate and accurate indications and records of the basis weight and/or moisture content of the paper by a non-contact, non-destructive measurement so that the apparatus may be conveniently incorporated directly in the production line and give instantaneous indications of error or undesired variations in these qualities of the paper sheet.

While but two specific embodiments of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for continuously measuring and indicating the basis weight of a moving sheet of paper during the manufacture thereof, comprising a sensing station interposed in the paper manufacturing production line through which the paper sheet passes, an incandescent lamp located at one side of the paper sheet at said sensing station which emits a beam of electromagnetic radiation having a spectral range substantially spanning part of the visible spectral region and extending into the near infrared region including a selected wave length band which is substantially unaffected by the moisture content of the paper sheet but which is modulated by variation in the pulp structure, optical means for directing said beam along a selected path through the moving paper sheet, optical filter means in the path of said beam for confining the same to said selected wave length band, photoelectric radiation detecting means disposed on the opposite side of said paper sheet from said lamp to receive the electromagnetic radiation in said selected band which passes through the paper sheet for producing a fluctuating voltage responsive to the modulation of said selected wave length band in the emergent beam by the paper sheet, and means calibrated in units of basis weight of paper for indicating the basis weight of the paper sheet.

2. Apparatus as defined in claim 1, wherein said filter means include a pair of filters respectively located between the paper sheet and each of said lamp and detecting means for restricting the wave length of said beam to said selected wave length band.

3. Apparatus as defined in claim 1, wherein said beam of electromagnetic radiation passing through said paper sheet is restricted to a wave length of about 7500 angstrom units.

4. Apparatus as defined in claim 1, wherein said means for producing said fluctuating voltage produces a D.C. voltage for indicating the basis weight of the paper sheet.

5. Apparatus as defined in claim 1, wherein said means for producing said fluctuating voltage includes amplifier means having selected frequency response characteristics for increasing the amplitude of voltage fluctuations and substantially excluding frequency components arising from variations in the velocity of the paper sheet.

6. Apparatus as defined in claim 1, including optical means for directing through the moving paper sheet at said sensing station a second beam of electromagnetic radiation having a second selected wave length band which is modulated by absorption due to water molecule absorption of the second beam, photoelectric detecting means disposed to receive electromagnetic radiation in said second wave length band which passes through the paper sheet for producing a second fluctuating voltage proportional to the basis weight of the paper intercepting said second beam with a moisture content variation, and means for combining the fluctuating voltages derived from the first mentioned beam and said second beam to produce a resultant voltage which is proportional only to the moisture content of the paper sheet.

7. Apparatus as defined in claim 6, wherein said second beam passing through said paper sheet is restricted to a wave length of about 4750 angstrom units.

References Cited by the Examiner
UNITED STATES PATENTS

| | | | |
|---|---|---|---|
| 2,503,165 | 4/1950 | Meyer | 88—14 X |
| 2,547,623 | 4/1951 | Cockrell | 88—14 |
| 2,549,402 | 4/1951 | Vossberg | 250—83.4 X |
| 2,844,068 | 7/1958 | Williams | 250—214 X |
| 2,868,995 | 1/1959 | Kelsey et al. | |
| 2,920,206 | 1/1960 | Heller | 250—83.4 X |
| 2,947,972 | 8/1960 | Steinbuch | 88—14 X |

References Cited by the Applicant
UNITED STATES PATENTS

| | | |
|---|---|---|
| 921,083 | 5/1909 | Chaney. |
| 2,393,631 | 1/1946 | Harrison et al. |
| 2,732,757 | 1/1956 | Bauer. |
| 2,895,055 | 7/1959 | Crane et al. |
| 3,105,152 | 9/1963 | Nash. |

OTHER REFERENCES

Pulp & Paper Chemistry and Chemical Technology, by James P. Casey, volume II, pages 804–809, published by Interscience Publishers, Inc., New York, 1952.

JEWELL H. PEDERSEN, *Primary Examiner.*

T. L. HUDSON, *Assistant Examiner.*